United States Patent
Zhu et al.

(10) Patent No.: US 12,378,453 B2
(45) Date of Patent: Aug. 5, 2025

(54) REACTIVE HOT MELT ADHESIVE COMPOSITION AND USE THEREOF

(71) Applicant: Henkel AG & Co. KGaA, Duesseldorf (DE)

(72) Inventors: Hongye Zhu, Shanghai (CN); Aifu Che, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 260 days.

(21) Appl. No.: 17/813,680

(22) Filed: Jul. 20, 2022

(65) Prior Publication Data
US 2022/0356383 A1    Nov. 10, 2022

Related U.S. Application Data

(63) Continuation of application No. PCT/CN2020/075044, filed on Feb. 13, 2020.

(51) Int. Cl.
| | |
|---|---|
| C09J 175/06 | (2006.01) |
| B32B 5/02 | (2006.01) |
| B32B 5/26 | (2006.01) |
| B32B 7/12 | (2006.01) |
| B32B 37/12 | (2006.01) |
| C08G 18/10 | (2006.01) |
| C08G 18/42 | (2006.01) |
| C08G 18/76 | (2006.01) |
| C09J 5/06 | (2006.01) |

(52) U.S. Cl.
CPC ............. *C09J 175/06* (2013.01); *B32B 5/02* (2013.01); *B32B 5/26* (2013.01); *B32B 7/12* (2013.01); *B32B 37/1207* (2013.01); *C08G 18/10* (2013.01); *C08G 18/4202* (2013.01); *C08G 18/7671* (2013.01); *C09J 5/06* (2013.01); *B32B 2037/1215* (2013.01); *B32B 2250/20* (2013.01); *B32B 2255/02* (2013.01); *B32B 2255/26* (2013.01); *B32B 2262/0276* (2013.01); *B32B 2437/00* (2013.01); *C09J 2400/266* (2013.01); *C09J 2475/00* (2013.01)

(58) Field of Classification Search
CPC .... C08G 18/7671; C08G 18/10; C08G 18/12; C08G 18/4018; C08G 18/42; C08G 18/4202; C08G 18/44; C08G 18/4854; C08G 18/6208; C08G 18/307; C09J 2301/06; C09J 2301/304; C09J 2203/358; C09J 5/06; C09J 175/08; C09J 2400/266; C09J 2475/00; B32B 5/02; B32B 5/26; B32B 7/12; B32B 37/1207; B32B 2037/1215; B32B 2250/20; B32B 2250/02; B32B 2255/02; B32B 2255/26; B32B 2437/00

See application file for complete search history.

(56) References Cited

U.S. PATENT DOCUMENTS

| | | | |
|---|---|---|---|
| 4,704,176 A * | 11/1987 | Botzman | .......... C08J 5/12 264/269 |
| 4,820,368 A | 4/1989 | Markevka et al. | |
| 5,436,302 A | 7/1995 | Stobbie et al. | |
| 5,869,593 A | 2/1999 | Helmeke et al. | |
| 6,133,400 A | 10/2000 | Helmeke | |
| 7,053,152 B2 | 5/2006 | Krebs et al. | |
| 7,074,297 B2 | 7/2006 | Shah | |
| 7,641,968 B2 | 1/2010 | Kanagawa et al. | |
| 7,906,607 B2 | 3/2011 | Ohori et al. | |
| 2003/0045636 A1 | 3/2003 | Krebs et al. | |
| 2006/0247369 A1 | 11/2006 | Griswold et al. | |
| 2007/0093595 A1 | 4/2007 | Griswold et al. | |
| 2008/0182925 A1* | 7/2008 | Wang | ............. C09J 175/04 524/68 |
| 2013/0274401 A1 | 10/2013 | Allen et al. | |
| 2015/0133014 A1 | 5/2015 | Traser et al. | |
| 2017/0321095 A1 | 11/2017 | Pela et al. | |
| 2019/0127618 A1* | 5/2019 | Kuramochi | ......... C08G 18/40 |

FOREIGN PATENT DOCUMENTS

| | | | |
|---|---|---|---|
| CN | 1341133 | A | 3/2002 |
| CN | 1354215 | A | 6/2002 |
| CN | 104302199 | A | 1/2015 |
| CN | 106496500 | A | 3/2017 |
| CN | 106543409 | A | 3/2017 |
| CN | 107001904 | A | 8/2017 |
| CN | 107722687 | * | 2/2020 |
| EP | 3150683 | A1 | 4/2017 |
| JP | S63218782 | A | 9/1988 |
| JP | 2007119749 | A | 5/2007 |
| WO | 2019138893 | A1 | 7/2019 |
| WO | 2019176941 | A1 | 9/2019 |

OTHER PUBLICATIONS

Polyester polyols, accessed online Jul. 29, 2024.*
International Search Report for PCT/CN2020/075044 Mailing date Nov. 17, 2020.
H. F. Hüber and H. Müller in "Shaping Reactive Hotmelts Using LMW Copolyesters", Adhesives Age, Nov. 1987, pp. 32 to 35.

* cited by examiner

*Primary Examiner* — Camie S Thompson
(74) *Attorney, Agent, or Firm* — Sun Hee Lehmann

(57) ABSTRACT

The present invention relates to a reactive hot melt adhesive composition and the use thereof. In particular, the present invention provides an adhesive having excellent washing resistance, especially having excellent resistance to antibacterial laundry cleansers. In addition, the adhesive has very short open time and good softness upon curing.

19 Claims, No Drawings

REACTIVE HOT MELT ADHESIVE COMPOSITION AND USE THEREOF

TECHNICAL FIELD

The present invention relates to a reactive hot melt adhesive composition and the use thereof. In particular, the present invention provides an adhesive having excellent washing resistance, especially having excellent resistance to antibacterial laundry cleansers. In addition, the adhesive has particularly short open time and good softness upon curing.

BACKGROUND

Hot melt adhesive compositions are solid at room temperature but, upon application of heat, melt to a liquid or fluid state in which molten form they are applied to a substrate. On cooling, the adhesive composition regains its solid form. The hard phase(s) formed upon cooling of the adhesive composition impart all of the cohesion (strength, toughness, creep and heat resistance) to the final bond. Hot melt adhesive compositions are thermoplastic and can be heated to a fluid state and cooled to a solid state repeatedly. Hot melt adhesive compositions do not include water or solvents.

Curable or reactive hot melt adhesive compositions are also solid at room temperature and, upon application of heat, melt to a liquid or fluid state in which molten form they are applied to a substrate. On cooling, the adhesive composition regains its solid form. The phase(s) formed upon cooling of the adhesive composition and prior to curing impart initial or green strength to the bond. The adhesive composition will cure by a chemical crosslinking reaction, typically by exposure of reactive moieties such as isocyanate in the prepolymer to suitable conditions such as moisture. Before curing the adhesive composition remains thermoplastic and can be remelted and resolidified. Once cured, the adhesive composition is in an irreversible solid form and is no longer thermoplastic.

Reactive hot melt adhesives have been widely used in bonding textile to textile, especially in the garment or particularly underwear manufacturing field to replace sewing and heat-sealing tapes, which simplifies processes, saves costs, reduces lead time, and obtains more competitive products in the market.

Reactive hot melt adhesives based on isocyanate-terminated (also referred to as "NCO-terminated") polyurethane prepolymers are described for example by H. F. Hüber and H. Müller in "Shaping Reactive Hotmelts Using LMW Copolyesters", Adhesives Age, November 1987, pages 32 to 35.

However, existing reactive hot melt adhesives cannot withstand frequent washing, especially when an antibacterial laundry cleanser is used. Therefore, there is a need in the art for reactive hot melt adhesives which overcome this drawback.

SUMMARY OF THE INVENTION

Disclosed herein is a reactive hot melt adhesive composition comprising at least one NCO-terminated polyurethane prepolymer, the NCO-terminated polyurethane prepolymer comprises the reaction product of the following components:
  a) at least one polyisocyanate,
  b) at least one polyol selected from polytetrahydrofurans, polybutadiene polyols, hydrogenated polybutadiene polyols, polycarbonate polyols and combinations thereof, and
  c) optionally, at least one polyol different from component b),
  wherein the NCO/OH ratio, which is a molar ratio of the NCO group of component a) to the total OH groups of components b) and c), is more than 1, preferably from about 1.5 to about 2.5.

Also disclosed herein is the cured product of the reactive hot melt adhesive composition according to the present invention.

Also disclosed herein is the use of the reactive hot melt adhesive composition according to the present invention for bonding two substrates, especially in a garment or underwear, wherein at least one of the two substrates is textile.

Other features and aspects of the subject matter are set forth in greater detail below.

DETAILED DESCRIPTION

It is to be understood by one of ordinary skill in the art that the present discussion is a description of exemplary embodiments only and is not intended as limiting the broader aspects of the present invention.

In one aspect, the present invention is generally directed to a reactive hot melt adhesive composition comprising at least one NCO-terminated polyurethane prepolymer, the NCO-terminated polyurethane prepolymer comprises, essentially consist of or consists of the reaction product of the following components:
  a) at least one polyisocyanate,
  b) at least one polyol selected from polytetrahydrofurans, polybutadiene polyols, hydrogenated polybutadiene polyols, polycarbonate polyols and combinations thereof, and
  c) optionally, at least one polyol different from component b),
  wherein the NCO/OH ratio, which is a molar ratio of the NCO group of component a) to the total OH groups of components b) and c), is more than 1, preferably from about 1.5 to about 2.5.

"About" as used herein in connection with a numerical value refers to the numerical value ±10% of the value, preferably ±5% of the value. For example, "about 20% by weight" thus relates to 20±2% by weight, preferably 20±1% by weight.

"Room temperature" as used herein refers to a temperature of about 20° C. to about 25° C., preferably about 25° C.

According to the present invention, the polyurethane prepolymer has a NCO/OH ratio, which is calculated by the molar amount of NCO groups of component a) dividing by the total molar amount of OH groups of components b) and c), of more than 1.

Polyurethane prepolymers are obtained by reacting the polyisocyanate a) with the polyols b) and c) (if present). By setting the NCO/OH ratio to more than 1, the polyurethane prepolymer contains free isocyanate groups and is terminated by the isocyanate groups. As an intermediate on the way to crosslinked polyurethane, the isocyanate-terminated polyurethane prepolymer reacts with a substrate surface or ambient moisture in order to extent the backbone and thus form a polyurethane polymer. Through the diffusion of moisture from the atmosphere or the substrates into the adhesive and subsequent reaction, the polyurethane prepolymer cures under atmosphere conditions. Therefore, the polyurethane hot melt adhesive composition is reactive and moisture curable. The cured adhesive product is a crosslinked material primarily bonded through urea groups and urethane groups.

In one embodiment, the polyurethane prepolymer has a NCO/OH ratio of from about 1.5 to about 2.5. With the NCO/OH ratio falling within the aforementioned ranges, the polyurethane prepolymer crosslinks sufficiently upon exposure to moisture, and has a desirable viscosity which is easy to spray without wiredrawing or penetrating through textile.

In one embodiment, the polyurethane prepolymer according to the present invention has a NCO content of from about 1% to about 5% by weight, preferably from about 1.2% to about 4% by weight, based on the total weight of the polyurethane prepolymer. With the NCO content falling within the aforementioned ranges, the polyurethane prepolymer crosslinks sufficiently upon exposure to moisture, and has a desirable viscosity which is easy to spray without wiredrawing or penetrating through textile.

According to the present invention, the polyurethane prepolymer is prepared by the reaction of component a) at least one polyisocyanate with component b) at least one polyol selected from polytetrahydrofurans, polybutadiene polyols, hydrogenated polybutadiene polyols, polycarbonate polyols and combinations thereof, optionally also with component c) at least one polyol different from component b).

As used herein, the term "polyisocyanate" is understood to have preferably from 2 to 4 isocyanate groups per molecule. Preferably, the polyisocyanate is diisocyanate, including aliphatic, alicyclic or aromatic diisocyanates.

In one embodiment, the aromatic diisocyanate is selected from 2,2'-methylene diphenyl diisocyanate (MDI), 4,4'-methylene diphenyl diisocyanate, 2,4'-methylene diphenyl diisocyanate, 2,4-toluene diisocyanate (TDI), 2,6-toluene diisocyanate, 1,3-phenylenediisocyanate (PDI), 1,4-phenylenediisocyanate, 1,4-naphthylene diisocyanate (NDI), 1,5-naphthylene diisocyanate, tetramethyl xylylene diisocyanate (TMXDI), 4,4'-dibenzyl diisocyanate, xylylene diisocyanate (XDI), and combinations thereof.

In one embodiment, the aliphatic isocyanate is selected from butane-1,4-diisocyanate, 1,6-hexamethylene diisocyanate (HMDI), 1,6-diisocyanato-2,2,4-trimethylhexane, 1,12-diisocyanato-dodecane, and combinations thereof.

In one embodiment, the alicyclic isocyanate is selected from isophorone diisocyanate (IPDI), 4,4-dicyclohexylmethanediisocyanate, 1,3-cyclohexane diisocyanate, 1,4-cyclohaxene diisocyanate, 1-methyl-2,4-diisocyanato-cyclohexane, and combinations thereof.

Preferably, the polyisocyanate is selected from 2,2'-methylene diphenyl diisocyanate, 4,4'-methylene diphenyl diisocyanate, 2,4'-methylene diphenyl diisocyanate, 2,4-toluene diisocyanate, 2,6-toluene diisocyanate, 1,6-hexamethylene diisocyanate, isophorone diisocyanate, or combinations thereof. More preferably, MDI is used as the polyisocyanate.

In the reactive hot melt adhesive composition according to the present invention, the amount of the component a) at least one polyisocyanate is from about 10% to about 40% by weight, preferably from about 15% to about 35% by weight, based on the total weight of the polyurethane prepolymer.

According to the present invention, component b) is at least one polyol selected from polytetrahydrofurans, polybutadiene polyols, hydrogenated polybutadiene polyols, polycarbonate polyols and combinations thereof. These specific polyols impart the cured product with excellent chemical resistance and excellent hydrolysis resistance.

In one embodiment, each component b) and c) has a functionality of 2. In other words, each polyol b) and c) is independently a diol. Functionality means the average number of hydroxy groups per molecule of polyol.

Component b) preferably has at least one terminal hydroxy group, more preferably has two terminal hydroxy groups, which promotes the formation of polyurethane prepolymer.

In one embodiment, the polyhydrofuran, polybutadiene polyol and hydrogenated polybutadiene polyol each has a number average molecular weight (Mn) of about 1,000 to about 5,000 g/mol, preferably about 1,000 to about 3,500 g/mol. Mn falling within the aforementioned ranges makes these specific polyether polyols compatible with other components in the formulation and adjusts the bonding strength and open time of the adhesive compositions.

In the present description, the number average molecular weight (Mn) can be determined by gel permeation chromatography (GPC) according to DIN 55672, in particular DIN 55672-1 with THF as the eluent.

As used herein, the term "polyhydrofuran" is exchangeable with poly(tetramethylene ether) glycol (PTMEG) and is represented by formula HO—(—CH$_2$)$_4$O—)$_n$—H. Polyhydrofuran has excellent chemical resistance and excellent hydrolysis resistance and imparts these properties to the derived polyurethane adhesive composition.

In some embodiments, polytetrahydrofuran is a white waxy solid or liquid at room temperature. It melts into colorless or pale yellow at about 25° C. to about 40° C.

Polytetrahydrofuran may be prepared through cationic ring-opening polymerization of tetrahydrofuran. Polytetrahydrofuran is commercially available, for example, as PTMEG 1000, PTMEG 1800, PTMEG 2000 and PTMEG 3000 from Korea PTG Co., Ltd.

In one embodiment, polybutadiene diol has a backbone represented by formula HO—(—C—C=C—C—)$_n$—OH. Hydrogenated polybutadiene diol has a backbone represented by formula HO—(—C—C—C—C—)$_n$—OH. The polybutadiene diol and hydrogenated polybutadiene diol may have one or more pendant groups grafted on their backbones for modification of properties. The pendant groups may be C1-C10 alkyl groups, for example. The polybutadiene diol and hydrogenated polybutadiene diol have excellent chemical resistance, hydrolysis resistance, aging resistance and yellowing resistance, and impart these properties to the derived polyurethane adhesive compositions. The hydrogenated polybutadiene diol is more excellent in respect of these properties and thus is preferable.

In some embodiments, polybutadiene diol and hydrogenated polybutadiene diol are colorless or pale-yellow liquids at room temperature. Some polybutadiene diol and hydrogenated polybutadiene diol do not have a glass transition temperature (Tg). If have, their glass transition temperatures (Tgs) are usually below 0° C., for example, from about −30° C. to about −50° C., preferably from about −30° C. to about −45° C.

As referred herein, the glass transition temperature (Tg) is measured by Differential Scanning calorimetry (DSC).

Polybutadiene diol and hydrogenated polybutadiene diol are commercially available. For example, they are sold under the product name Krasol by Cray Valley Corporation. Specific examples of polybutadiene diol include Krasol LBH-P 2000, Krasol LBH 3000 and Krasol LBH-P 3000. Specific examples of hydrogenated polybutadiene diol include Krasol HLBH-P2000 and Krasol HLBH-P3000.

In one embodiment, the term "polycarbonate polyol" is understood as having repeating unit —O—C(O)O— and is terminated by one or more, preferably two hydroxyl groups. The polycarbonate polyol, preferably polycarbonate diol has excellent weather resistance and hydrolysis resistance and imparts these properties to the derived polyurethane adhesive composition.

In one embodiment, the polycarbonate polyol is amorphous, so it imparts good sprayability to the polyurethane prepolymer and imparts good softness to the cured product. The polycarbonate polyol can be solid or liquid at room temperature. For an amorphous solid, its glass transition temperature (Tg) is higher than room temperature. The glass transition temperature (Tg) of an amorphous liquid, if have, is lower than room temperature.

Polycarbonate polyols can be prepared, for example, by the reaction from aliphatic diols, like propylene glycol, 1,4-butanediol, 1,5-pentadiol, 1,6-hexenediol, diethylene glycol, triethylene glycol or mixtures thereof, with diarylcarbonates or dialkylcarbonates, such as dimethylcarbonate.

Polycarbonate diols are commercially available. For example, they are sold as a series of products under the tradename Duranol™ by Asahi Kasei Corporation. Specific examples of polycarbonate diols include Duranol™ T5652, Duranol™ T5651, Duranol™ T5650J, Duranol™ T5650E, Duranol™ T4672, Duranol™ T4671, Duranol™ T4692, Duranol™ T4691, Duranol™ T6001, Duranol™ T6002, Duranol™ G3452 and Duranol™ G3450J.

In the reactive hot melt adhesive composition according to the present invention, the amount of component b) is about 5% to about 70%, preferably about 10% to about 60%, more preferably about 20% to about 60% by weight, based on the total weight of the polyurethane prepolymer.

In one embodiment, component c), at least one polyol different from component b), is comprised in the reactants for preparing the polyurethane prepolymer. There is no specific limitation on component c), and polyether polyols or polyester polyols commonly used in preparing polyurethanes can be used herein, so long as it does not adversely affect the desired properties of the inventive hot melt adhesive composition.

In one embodiment, component c) is selected from polyether polyols, polyester polyols and combinations thereof.

Component c) may be crystalline, amorphous or a mixture thereof.

In one embodiment, component c) is crystalline and has a melting point of about 40 to about 100° C. If component c) is crystalline and has a melting point of about 40 to about 100° C., the aggregation of crystal grains makes the surface dry in a short period, therefore the adhesive composition has a very short open time, such as about 1 to no more than about 5 minutes, preferably about 1 to about 2 minutes.

In another embodiment, component c) is amorphous and has a glass transition temperature (Tg) of about −40 to about 40° C. Preferably, the glass transition temperature (Tg) of component c) is equal to or higher than the Tg of component b).

If component c) is amorphous and has a glass transition temperature (Tg) of about −40 to about 40° C., especially when component c) has a Tg equal to or higher than the Tg of component b), the adhesive composition has a higher viscosity, which helps the surface dry in a short period, therefore the adhesive composition has a very short open time, such as about 1 to no more than about 5 minutes, preferably about 1 to about 2 minutes.

Component c) is commercially available. For example, Commercial products of component c) include Dnyacoll series from Evonik Corporation, such as amorphous liquid polyols with Tgs being from about −30 to about −10° C., for example, Dnyacoll 7210, Dnyacoll 7230 and Dnyacoll 7231; amorphous polyols with Tgs being from about 10 to about 50° C., for example, Dnyacoll 7110, Dnyacoll 7111, Dnyacoll 7130, Dnyacoll 7131, Dnyacoll 7140 and Dnyacoll 7150; crystalline polyols with melting points being from about 40 to about 100° C., for example, Dnyacoll 7320, Dnyacoll 7330, Dnyacoll 7340, Dnyacoll 7360, Dnyacoll 7362, Dnyacoll 7363, Dnyacoll 7365, Dnyacoll 7380 and Dnyacoll 7381. Commercial products of component c) also include aromatic polyester polyols sold as Stepanpol series by Stepan Company, for example, stepanpol PH-56, PHN-56, PDP-70, and PN-110.

In the reactive hot melt adhesive composition according to the present invention, the amount of component c) is from about 0% to about 75%, preferably about 20% to about 60% by weight, based on the total weight of the polyurethane prepolymer.

In one embodiment, the NCO-terminated polyurethane prepolymer comprises, essentially consists of or consist of the reaction product of the following components:

a) about 10% to about 40%, preferably about 15% to about 35% by weight of at least one polyisocyanate, b) about 5% to about 70%, preferably about 10% to about 60%, more preferably about 20% to about 60% by weight of at least one polyol selected from polytetrahydrofurans, polybutadiene polyols, hydrogenated polybutadiene polyols, polycarbonate polyols and combinations thereof, and c) 0 to about 75%, preferably about 20% to about 60% by weight of at least one polyol different from component b), based on the total weight of the polyurethane prepolymer.

The reactive hot melt adhesive composition according to the present invention has a Brookfield viscosity of from about 10000 to about 30000 cps, preferably from about 15000 to about 20000 cps at 120° C., measured according to ASTM 1084-1997 by a Brookfield viscometer RVDVII equipped with a Thermosel heating unit using spindle 27 at from 2.5 to 10 rpm.

In one embodiment, the melting temperature of the adhesive composition is about 100 to about 140° C.

In the present description, the melting temperature refers to a value measured by differential scanning calorimeter (DSC) according to ISO 11357, in particular ISO 11357-3, if not stated otherwise. Specifically, a peak top of an endothermic peak observed when the temperature is raised from −50° C. to 250° C. at a rate of 10° C./minute was regarded as the melting temperature.

After washing, especially after washing with an antibacterial laundry cleanser, the bonding strength retention of the cured composition is about 75% or more, preferably about 80% or more, more preferably about 83% or more. The bonding strength retention is calculated by dividing the bonding strength of the cured product after washing by the bonding strength of the cured product before washing.

The bonding strength of cured product is measured according to JIS L1093 Method A-1. The antibacterial laundry cleanser comprises at least one cleanser and at least one antibacterial agent. There is no particular limitation on the cleanser and antibacterial agent, and those commonly used in laundry are suitable herein. For example, commercially available examples of the cleanser include Head & Shoulder available from P&G corporation. Commercially available examples of the antibacterial agent include products sold under the tradenames of Dettol® and Walch®.

In some embodiments, the reactive hot melt adhesive according to the present invention has a very short open time, for example, from about 1 to no more than about 5 minutes, preferably from about 1 to about 2 minutes. "Open time" refers to the minimum required time from when adhesive is applied to when installation can begin.

In some embodiments, the reactive hot melt adhesive composition according to the present invention can withstand washing at a high temperature, for example, at a temperature of about 60° C. or higher, about 70° C. or higher, about 80° C. or higher, and about 90° C. or higher, such as at about 92° C.

In some embodiments, the cured composition according to the present invention has a soft touch, which makes it suitable for use in garments, especially in underwears.

While the adhesive compositions may be used directly as described above, if desired, the adhesive compositions of the present invention may also be formulated with conventional additives which are compatible with the compositions. Such additives include defoamers, plasticizers, compatible tackifiers, curing catalysts, dissociation catalysts, fillers, rheology modifiers, anti-oxidants, pigments, adhesion promoters, stabilizers, flame retardant and the like. Conventional additives that are compatible with a composition according to this invention may simply be determined by combining a potential additive with the composition and determining if they are compatible. An additive is compatible if it is homogenous within the product.

Generally, the reactive hot melt adhesive composition according to the present invention are useful for bonding two substrates, especially in a garment or underwear, wherein at least one of the two substrates is textile. The other substrate may be textile or foam. Specifically, the reactive hot melt adhesive composition according to the present invention may be used in bonding textile to textile, or bonding textile to foam in garments, especially in underwears.

The reactive hot melt adhesive according to the present invention is heated to melt and the melted adhesive is applied onto one or both of the substrates to be bonded.

Final curing may be carried out using various conditions. In particular, curing is achieved through action of airborne moisture where the relative humidity is no less than 10%, preferably no less than 25%, more preferably no less than 50%.

The composition is typically distributed and stored in its solid form in the absence of moisture. When the composition is ready for use, the solid is heated and melted prior to application. Thus, this invention includes reactive hot melt adhesive compositions in both its solid form, as it is typically to be stored and distributed, and its liquid form, after it has been melted, just prior to its application.

EXAMPLES

The following examples illustrate the invention and are not intended to limit the same.

Raw Materials

Component a):
  MDI: 4'4-methylene diphenyl diisocyanate, commercially available from Convestro.

Component b):
  PTMEG 2000: polytetrahydrofuran, Mn: 2000 g/mol, Tg: −76° C., melting point: 32° C., commercially available from PTG Co., Ltd.
  HLBH-P 2000: hydrogenated polybutadiene diol, Mn: 2100 g/mol, liquid, Tg: −30° C., commercially available from Cray Valley Corporation.
  Duranol T 5652: polycarbonate diol, amorphous, liquid, Tg: −54° C., commercially available from Asahi Kasei Corporation.

Component c):
  Dynacoll 7130: polyester polyol, amorphous, solid, Tg: 30° C., available from Evonik Corporation.
  Dynacoll 7210: polyester polyol, amorphous, liquid, Tg: −15° C., available from Evonik Corporation.
  Dynacoll 7231: polyester polyol, amorphous, liquid, Tg: −30° C., available from Evonik Corporation.
  Dynacoll 7360: polyester polyol, crystalline, melting point: 55° C., available from Evonik Corporation.
  PES 9007: liquid polyester polyol, amorphous, liquid, Tg: −20° C., available from Xuchuan Corporation.
  PN-110: polyester polyol, amorphous, Tg: 25° C., available from Stepan Company.

Prepolymer Preparation

The prepolymers were prepared according to the formulations listed in Table 1. The total weight of all components of the prepolymers is 100 weight parts.

All polyols were added in a three-neck round flask to be melted and mixed under vacuum until homogeneous and dehydrated at 130° C. for 2 hours. Then MDI was added to the mixture at 100° C., and polymerization was allowed to proceed with mixing under vacuum at 110° C. until the reaction was completed after 1.5 hours. The remaining NCO content was analyzed by nitration to determine the completion of the reaction.

Testing Method and Evaluation:

Bonding Strength Retention

Each prepolymer prepared as above was coated onto a 10 m*0.5 m polyester fabric (available from Xiaoshan Rongli Corporation) by a gravure roller (X-TH13, available from Xinxin Corporation in Dongguan) at 90 to 120° C. with a thickness of 20 μm, and then laminated with another 10 m*0.5 m polyester fabric so as to give a laminated sample. The laminated sample was cured at 23° C. and 50% relative humidity for 3-7 days. The bonding strength of the cured laminated sample was measured according to JIS L1093 Method A-1. Each bonding strength was measured for 3 times and the average value was recorded as N1. Then the cured laminated samples were immersed into an aqueous mixture of Head & Shoulder (cleanser, available from P&G corporation) and Dettol® (antibacterial agent) for 72h. The bonding strength after washing was measured in the same way as N1 and recorded N2.

Bonding strength retention=N2/N1*1100%

Open Time

A 10 cm*1 cm paper was coated with each prepolymer prepared as above by a gravure roller (X-TH13, available from Xinxin Corporation in Dongguan) at 100 to 140° C. with a thickness of 20 μm. A paper stripe (1.5 cm*5.0 cm) was attached to the coated paper by finger pressure every 30 seconds. The open time was defined as the time until fiber tear of the paper stripe was observed.

Softness

The cured laminated sample obtained above for measuring the bonding strength N1 was touched by bands of 5 volunteers. The cured laminated sample was considered as having a good softness if all the 5 volunteers had soft handfeels.

TABLE 1

| Components (weight part) | Raw Material | Ex 1 | Ex 2 | Ex 3 | Ex 4 | Ex 5 | Ex 6 | Ex 7 | Com Ex 1 |
|---|---|---|---|---|---|---|---|---|---|
| Component a) | MDI | 20 | 20.96 | 19 | 20.96 | 20.96 | 14.94 | 23.47 | 37.34 |
| Component b) | PTMEG 2000 | 20 | 43.91 | 30 | — | — | 60 | 5 | — |
| | HLBH-P 2000 | — | — | — | 43.91 | — | — | — | — |
| | Duranol T-5652 | — | — | — | — | 43.91 | — | — | — |
| Component c) | Dynacoll 7210 | — | — | 20 | — | — | — | — | — |
| | Dynacoll 7130 | 30 | — | 10 | — | — | — | — | — |
| | Dnyacoll 7231 | — | 10 | — | 10 | 10 | 7.14 | 16.95 | 17.84 |
| | Dynacoll 7360 | — | 8.78 | 10 | 8.78 | 8.78 | 6.26 | 16.88 | 15.66 |
| | PN-110 | — | 16.35 | 11 | 16.35 | 16.35 | 11.66 | 37.7 | 29.16 |
| | PES 9007 | 30 | — | — | — | — | — | — | — |
| Total weight (weight part) | | 100 | 100 | 100 | 100 | 100 | 100 | 100 | 100 |
| NCO/OH ratio | | 2.33 | 1.94 | 2.04 | 2.03 | 1.94 | 1.32 | 1.92 | 3.94 |
| NCO content (wt. %) | | 3.85 | 3.43 | 3.27 | 3.76 | 3.43 | 1.23 | 3.84 | 9.39 |
| Bonding strength N1 before washing (N/inch) | | 42.22 | 50.96 | 34.2 | 12.36 | 40.01 | 12.49 | 49.17 | 10.21 |
| Bonding strength N1 before washing (N/inch) | | 42.38 | 48.66 | 35.01 | 10.57 | 33.54 | 12.1 | 38.38 | 4.64 |
| Bonding strength retention N1/N2 (%) | | 100.38 | 95.49 | 102.37 | 85.52 | 83.83 | 96.88 | 78.06 | 45.45 |
| Open time | | 120 s | 90 s | 100 s | 80 s | 110 s | 70 s | 300 s | 15 min |
| Softness | | Good | Good | Good | Good | Good | Good | Good | Good |

As shown by the results in Table 1, the adhesive compositions prepared in Examples 1 to 7 had high bonding strength retention of 78% or more, short open time of no more than 5 min and good softness. In Examples 1 to 6, the content of component b) was more than 10% by weight, the bonding strength retention was desirably higher (83% or more), and the open time was shorter (no more than 2 minutes).

The bonding strength in Examples 1 and 3 increased after washing. It is presumed that the reason for this phenomenon might lie in the rearrangement of the cured adhesive molecules upon wetting by water.

The adhesive composition prepared in Comparative Example 1 did not comprise component b), and its bonding strength retention was only 45.45%, and its open time was as long as 15 minutes.

These and other modifications and variations of the present invention may be practiced by those of ordinary skill in the art, without departing from the spirit and scope of the present invention. In addition, it should be understood that aspects of the various embodiments may be interchanged in whole or in reactant. Furthermore, those of ordinary skill in the art will appreciate that the foregoing description is by way of example only and is not intended to limit the invention so further described in such appended claims.

What is claimed is:

1. A reactive hot melt adhesive composition comprising at least one NCO-terminated polyurethane prepolymer, wherein the NCO-terminated polyurethane prepolymer comprises the reaction product of a mixture comprising:
   at least one polyisocyanate;
   at least one polytetrahydrofuran; and
   at least one polyol different from the at least one polytetrahydrofuran and not including a polyester polyol,
   wherein:
   a molar ratio of the NCO group of the at least one polyisocyanate to the total OH groups of the at least one polytetrahydrofuran and the at least one polyol is from about 1.5 to about 2.5, and
   the at least one polytetrahydrofuran is in an amount of from about 20% to about 60% by weight, based on the total weight of the NCO-terminated polyurethane prepolymer.

2. The reactive hot melt adhesive composition of claim 1, wherein the amount of the NCO group is from about 1% to about 5% by weight, based on the total weight of the NCO-terminated polyurethane prepolymer.

3. The reactive hot melt adhesive composition of claim 1, wherein the at least one polyisocyanate is a diisocyanate selected from the group consisting of 2,2'-methylene diphenyl diisocyanate, 4,4'-methylene diphenyl diisocyanate, 2,4'-methylene diphenyl diisocyanate, 2,4-toluene diisocyanate, 2,6-toluene diisocyanate, 1,6-hexamethylene diisocyanate, isophorone diisocyanate, and any combination thereof.

4. The reactive hot melt adhesive composition of claim 1, wherein the at least one polytetrahydrofuran has a number average molecular weight (Mn) of from about 1,000 g/mol to about 5,000 g/mol.

5. The reactive hot melt adhesive composition of claim 4, wherein the at least one polytetrahydrofuran has a number average molecular weight (Mn) of from about 1,000 g/mol to about 3,500 g/mol.

6. The reactive hot melt adhesive composition of claim 1, wherein the at least one polyol is amorphous and has a glass transition temperature (Tg) of from about −40° C. to about 40° C.

7. The reactive hot melt adhesive composition of claim 1, wherein:
   the at least one polyisocyanate is in an amount of from about 10% to about 40%, based on the total weight of the NCO-terminated polyurethane prepolymer, the at least one polytetrahydrofuran is in an amount of from about 20% to about 60%, based on the total weight of the NCO-terminated polyurethane prepolymer, and the at least one polyol is in an amount of from about 20% to about 60%, based on the total weight of the NCO-terminated polyurethane prepolymer.

8. The reactive hot melt adhesive composition of claim 1, wherein the melting temperature of the reactive hot melt adhesive composition is from about 100 to about 140° C.

9. A cured product comprising the reactive hot melt adhesive composition of claim 1.

10. The cured product of claim 9, wherein the cured product exhibits a bonding strength retention after washing of more than about 75%, wherein the bonding strength retention is calculated by dividing the bonding strength of the cured product after washing by the bonding strength of the cured product before washing.

11. An article comprising two textile substrates bonded by the cured product of claim 9.

12. A garment or undergarment comprising two textile substrates bonded by the cured product of claim 9.

13. A reactive hot melt adhesive composition comprising at least one NCO-terminated polyurethane prepolymer, wherein the NCO-terminated polyurethane prepolymer comprises the reaction product of a mixture comprising:

4'4-methylene diphenyl diisocyanate in an amount of from 15% to about 35% by weight, based on the total weight of the NCO-terminated polyurethane prepolymer;

polytetrahydrofuran in an amount of from about 20% to about 60% by weight, based on the total weight of the NCO-terminated polyurethane prepolymer; and at least one polyol in an amount of from about 1.2% to about 4% by weight, based on the total weight of the NCO-terminated polyurethane prepolymer, the at least one polyol being selected from polyether polyols other than polytetrahydrofuran, polyester polyols, and any combination thereof, wherein:

a molar ratio of the NCO group of the 4'4-methylene diphenyl diisocyanate to the total OH groups of the polytetrahydrofuran and the at least one polyol is from about 1.5 to about 2.5, and the amount of the NCO group is from about 1.2% to about 4% by weight, based on the total weight of the NCO-terminated polyurethane prepolymer.

14. The reactive hot melt adhesive composition of claim 13, wherein the polytetrahydrofuran has a number average molecular weight (Mn) of from about 1,000 g/mol to about 5,000 g/mol.

15. The reactive hot melt adhesive composition of claim 14, wherein the polytetrahydrofuran has a number average molecular weight (Mn) of from about 1,000 g/mol to about 3,500 g/mol.

16. A cured product comprising the reactive hot melt adhesive composition of claim 13.

17. The cured product of claim 16, wherein the cured product exhibits a bonding strength retention after washing of more than about 75%, wherein the bonding strength retention is calculated by dividing the bonding strength of the cured product after washing by the bonding strength of the cured product before washing.

18. An article comprising two textile substrates bonded by the cured product of claim 16.

19. A garment or undergarment comprising two textile substrates bonded by the cured product of claim 16.

\* \* \* \* \*